United States Patent
Longenecker

(10) Patent No.: US 11,841,176 B2
(45) Date of Patent: Dec. 12, 2023

(54) METHOD OF OPERATING AN ELECTRONIC EXPANSION VALVE IN AN AIR CONDITIONER UNIT

(71) Applicant: Haier US Appliance Solutions, Inc., Wilmington, DE (US)

(72) Inventor: Joshua Duane Longenecker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 50 days.

(21) Appl. No.: 17/539,305

(22) Filed: Dec. 1, 2021

(65) Prior Publication Data
US 2023/0168011 A1   Jun. 1, 2023

(51) Int. Cl.
F25B 41/34   (2021.01)

(52) U.S. Cl.
CPC .......... *F25B 41/34* (2021.01); *F25B 2500/28* (2013.01); *F25B 2600/0253* (2013.01); *F25B 2600/2513* (2013.01)

(58) Field of Classification Search
CPC .................. F25B 41/34; F25B 2500/28; F25B 2600/0253; F25B 2600/2513
See application file for complete search history.

(56) References Cited

U.S. PATENT DOCUMENTS

| | | |
|---|---|---|
| 5,533,347 A | 7/1996 | Ott |
| 7,076,962 B2 | 7/2006 | He |
| 7,784,296 B2 | 8/2010 | Chen |
| 8,151,583 B2 | 4/2012 | Douglas |
| 10,174,977 B2 | 1/2019 | Lin |
| 10,254,026 B2 | 4/2019 | Patel |
| 10,486,499 B2 | 11/2019 | Stanke |
| 10,612,826 B2 | 4/2020 | Hern |
| 10,704,814 B2 | 7/2020 | De |
| 10,823,448 B2 | 11/2020 | Jiang |
| 10,828,965 B2 | 11/2020 | Xu |
| 2005/0126190 A1 | 6/2005 | Lifson |

(Continued)

FOREIGN PATENT DOCUMENTS

| | | |
|---|---|---|
| CN | 103836861 A | 6/2014 |
| CN | 105667250 B | 4/2018 |

(Continued)

*Primary Examiner* — Kun Kai Ma
(74) *Attorney, Agent, or Firm* — Dority & Manning, P.A.

(57) ABSTRACT

An air conditioner unit includes a refrigeration loop comprising an outdoor heat exchanger, an indoor heat exchanger, a compressor for circulating refrigerant, and an electronic expansion valve. A controller performs a first operating cycle of the air conditioner unit with the compressor at a first compressor speed and the electronic expansion valve in a first valve position, receives a command to perform a second operating cycle at a target compressor speed, determines that the target compressor speed of the second operating cycle corresponds to the first compressor speed, and initiates the second operating cycle with the electronic expansion valve positioned at the first valve position. The controller is further configured to determine that the first valve position is below a predetermined position threshold at an end of the first operating cycle and open the electronic expansion valve to the predetermined position threshold after the first operating cycle.

20 Claims, 8 Drawing Sheets

(56) References Cited

U.S. PATENT DOCUMENTS

| | | |
|---|---|---|
| 2013/0174591 A1 | 7/2013 | Das |
| 2014/0137573 A1 | 5/2014 | Lin |
| 2017/0074552 A1* | 3/2017 | Park ..................... F25B 47/022 |
| 2020/0158370 A1 | 5/2020 | Lu |

FOREIGN PATENT DOCUMENTS

| | | | |
|---|---|---|---|
| CN | 106196764 B | 5/2019 | |
| CN | 106322640 B | 5/2019 | |
| CN | 111076367 B | 11/2020 | |
| EP | 3199889 A1 * | 8/2017 | ............. F25B 13/00 |
| JP | H01222164 A | 9/1989 | |
| KR | 101372144 B1 | 3/2014 | |
| KR | 20190101675 A | 9/2019 | |
| WO | WO2020166273 A1 | 8/2020 | |

\* cited by examiner

METHOD OF OPERATING AN ELECTRONIC EXPANSION VALVE IN AN AIR CONDITIONER UNIT

FIELD OF THE INVENTION

The present disclosure relates generally to air conditioner units, and more particularly to methods of operating electronic expansion valves in air conditioner units.

BACKGROUND OF THE INVENTION

Air conditioner or conditioning units are conventionally utilized to adjust the temperature indoors, e.g., within structures such as dwellings and office buildings. Such units commonly include a closed refrigeration loop to heat or cool the indoor air. Typically, the indoor air is recirculated while being heated or cooled. A variety of sizes and configurations are available for such air conditioner units. For example, some units may have one portion installed within the indoors that is connected to another portion located outdoors, e.g., by tubing or conduit carrying refrigerant. These types of units are typically used for conditioning the air in larger spaces.

Another type of air conditioner unit, commonly referred to as single-package vertical units (SPVU) or package terminal air conditioners (PTAC), may be utilized to adjust the temperature in, for example, a single room or group of rooms of a structure. These units typically operate like split heat pump systems, except that the indoor and outdoor portions are defined by a bulkhead and all system components are housed within a single package that installed in a wall sleeve positioned within an opening of an exterior wall of a building.

When a conventional PTAC is operating in a cooling or heating mode, a compressor circulates refrigerant within a sealed system, while indoor and outdoor fans urge flows of air across indoor and outdoor heat exchangers respectively. For example, when running these air conditioner units to either heat or cool a room at various ambient conditions or compressor speeds, an expansion device (such as an electronic expansion valve or "EEV") is used to expand refrigerant and permit a phase change from liquid to vapor within the evaporator prior to passing the refrigerant back into the compressor. However, if the expansion valve is not set to an ideal position, the unit will run inefficiently or even potentially damage the compressor (e.g., by passing liquid refrigerant into the compressor). To avoid these conditions, EEVs may operate to regulate the superheat of refrigerant (i.e., the temperature of refrigerant above its saturated vapor temperature) within the evaporator to ensure the refrigerant is in gaseous phase entering the compressor. However, adjusting the EEV to stabilize at the ideal superheat value can take some time, resulting in cycle inefficiencies, particularly for short operating cycles where the controller may require most of the operating cycle to establish the target EEV position.

In addition, if the EEV is in a restricted position at the end of a cooling cycle or heat pump cycle, the pressure within the refrigerant loop may not equalize before the system requests another cooling/heat pump cycle. This can cause the compressor to stall or lock up when starting, thereby creating noise, vibration, reduced compressor life, and poor system performance.

Accordingly, improved air conditioner units and methods of operation would be useful. More specifically, a heat pump air conditioner unit that regulates an electronic expansion valve for improved operating efficiency and system performance would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, an air conditioner unit is provided including a refrigeration loop including an outdoor heat exchanger and an indoor heat exchanger, a compressor operably coupled to the refrigeration loop and being configured to urge a flow of refrigerant through the refrigeration loop, an electronic expansion valve fluidly coupled to the refrigeration loop, and a controller operably coupled to the compressor and the electronic expansion valve. The controller is configured to perform a first operating cycle of the air conditioner unit with the compressor at a first compressor speed and the electronic expansion valve in a first valve position, receive a command to perform a second operating cycle at a target compressor speed, determine that the target compressor speed of the second operating cycle corresponds to the first compressor speed, and initiate the second operating cycle with the electronic expansion valve positioned at the first valve position.

In another exemplary embodiment, a method of operating an air conditioner unit is provided. The air conditioning unit includes a refrigeration loop, a compressor, and an electronic expansion valve. The method includes performing a first operating cycle of the air conditioner unit with the compressor at a first compressor speed and the electronic expansion valve in a first valve position, receiving a command to perform a second operating cycle at a target compressor speed, determining that the target compressor speed of the second operating cycle corresponds to the first compressor speed, and initiating the second operating cycle with the electronic expansion valve positioned at the first valve position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
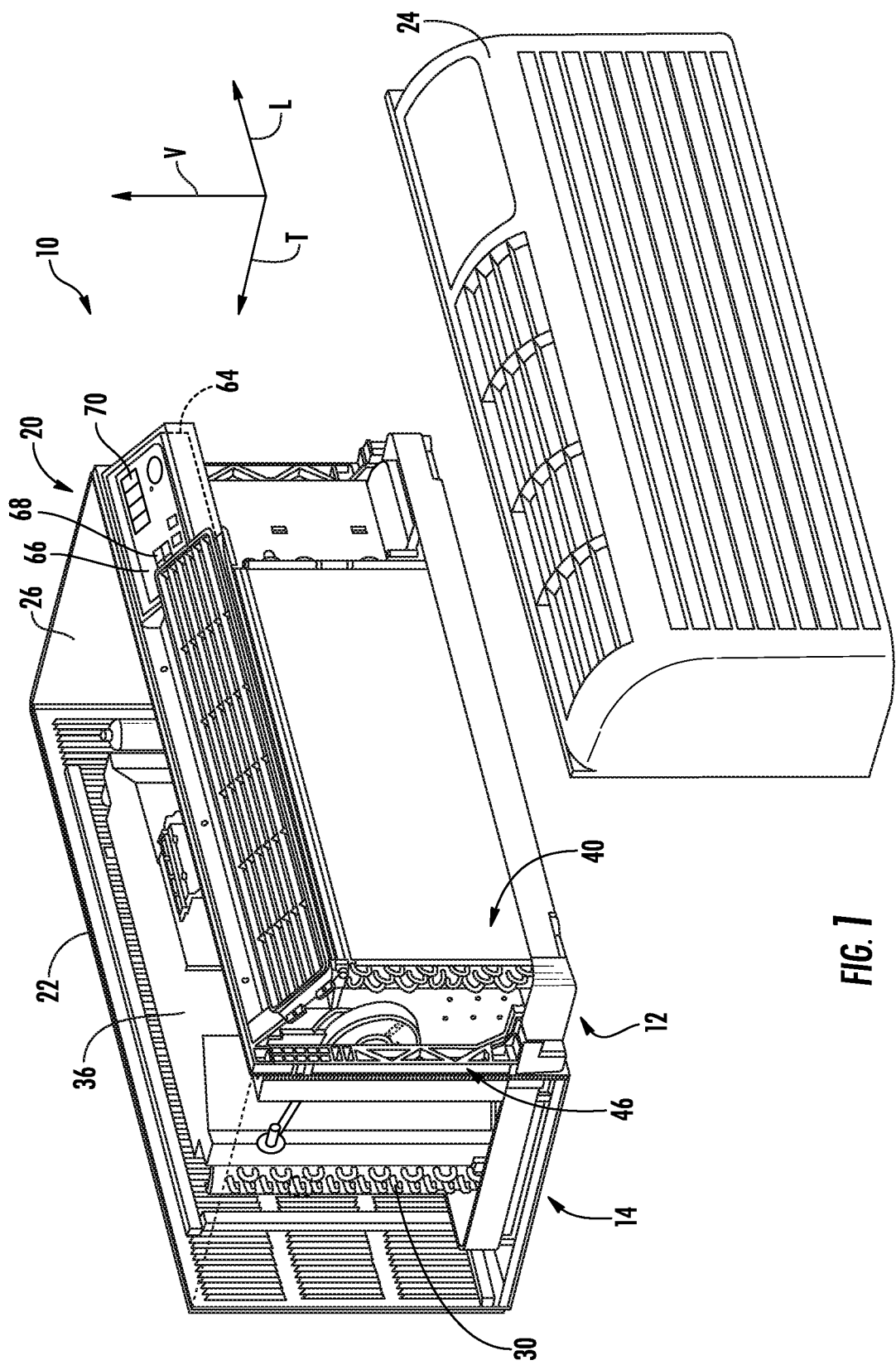
FIG. 1 provides a perspective view of an air conditioner unit, with part of an indoor portion exploded from a remainder of the air conditioner unit for illustrative purposes, in accordance with one exemplary embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
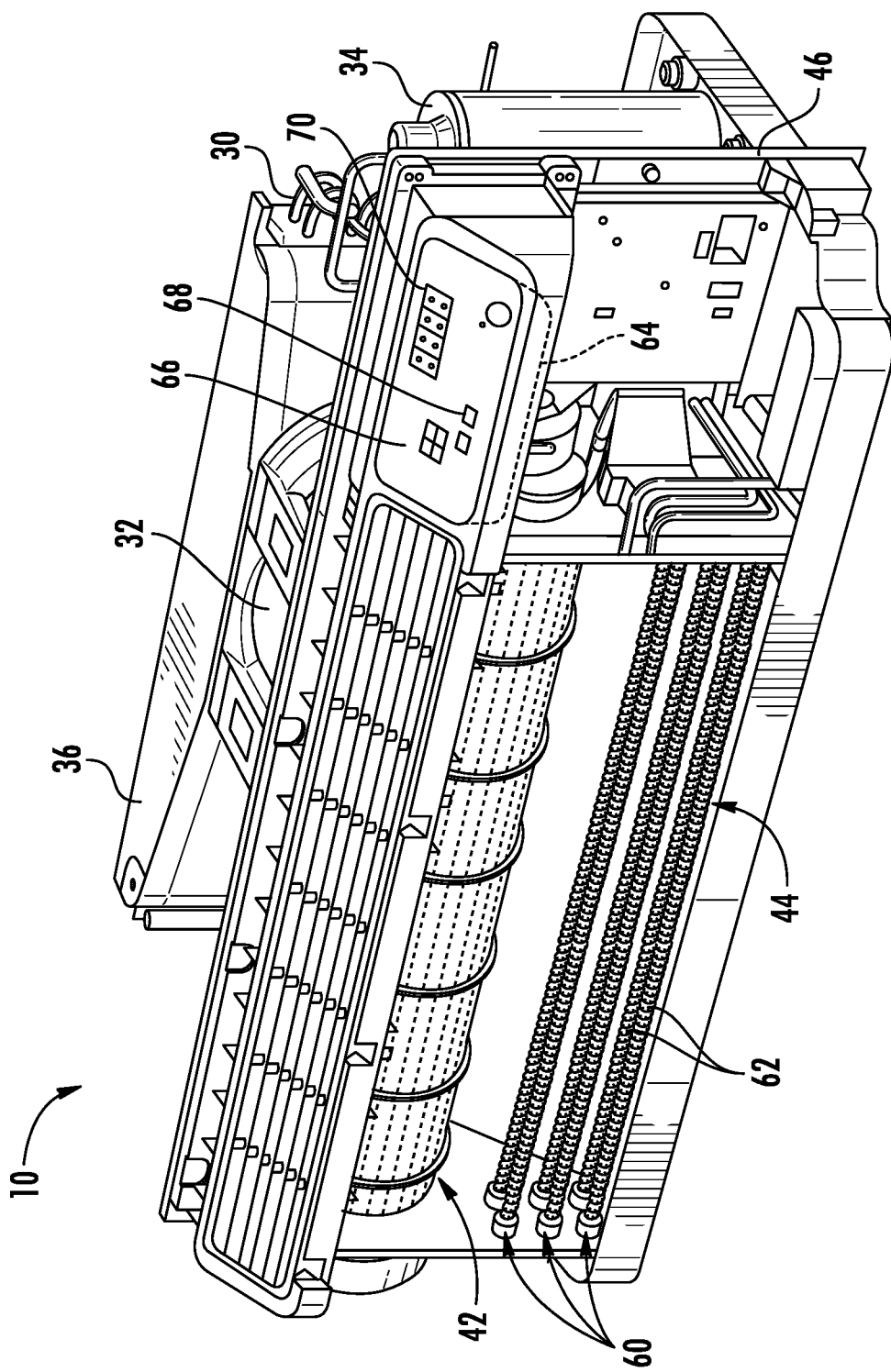
FIG. 2 is another perspective view of components of the indoor portion of the exemplary air conditioner unit of FIG. 1.

Referring now to FIGS. 1 and 2, an air conditioner unit 10 is provided. The air conditioner unit 10 is a one-unit type air conditioner, also conventionally referred to as a room air conditioner or a packaged terminal air conditioner (PTAC). The unit 10 includes an indoor portion 12 and an outdoor portion 14, and generally defines a vertical direction V, a lateral direction L, and a transverse direction T. Each direction V, L, T is perpendicular to each other, such that an orthogonal coordinate system is generally defined. Although aspects of the present subject matter are described with reference to PTAC unit 10, it should be appreciated that aspects of the present subject matter may be equally applicable to other air conditioner unit types and configurations, such as single package vertical units (SPVUs) and split heat pump systems.

A housing 20 of the unit 10 may contain various other components of the unit 10. Housing 20 may include, for example, a rear grill 22 and a room front 24 which may be spaced apart along the transverse direction T by a wall sleeve 26. The rear grill 22 may be part of the outdoor portion 14, and the room front 24 may be part of the indoor portion 12. Components of the outdoor portion 14, such as an outdoor heat exchanger 30, an outdoor fan 32, and a compressor 34 may be housed within the wall sleeve 26. A fan shroud 36 may additionally enclose outdoor fan 32, as shown.

Indoor portion 12 may include, for example, an indoor heat exchanger 40, a blower fan or indoor fan 42, and a heating unit 44. These components may, for example, be housed behind the room front 24. Additionally, a bulkhead 46 may generally support and/or house various other components or portions thereof of the indoor portion 12, such as indoor fan 42 and the heating unit 44. Bulkhead 46 may generally separate and define the indoor portion 12 and outdoor portion 14.

Figure 3:
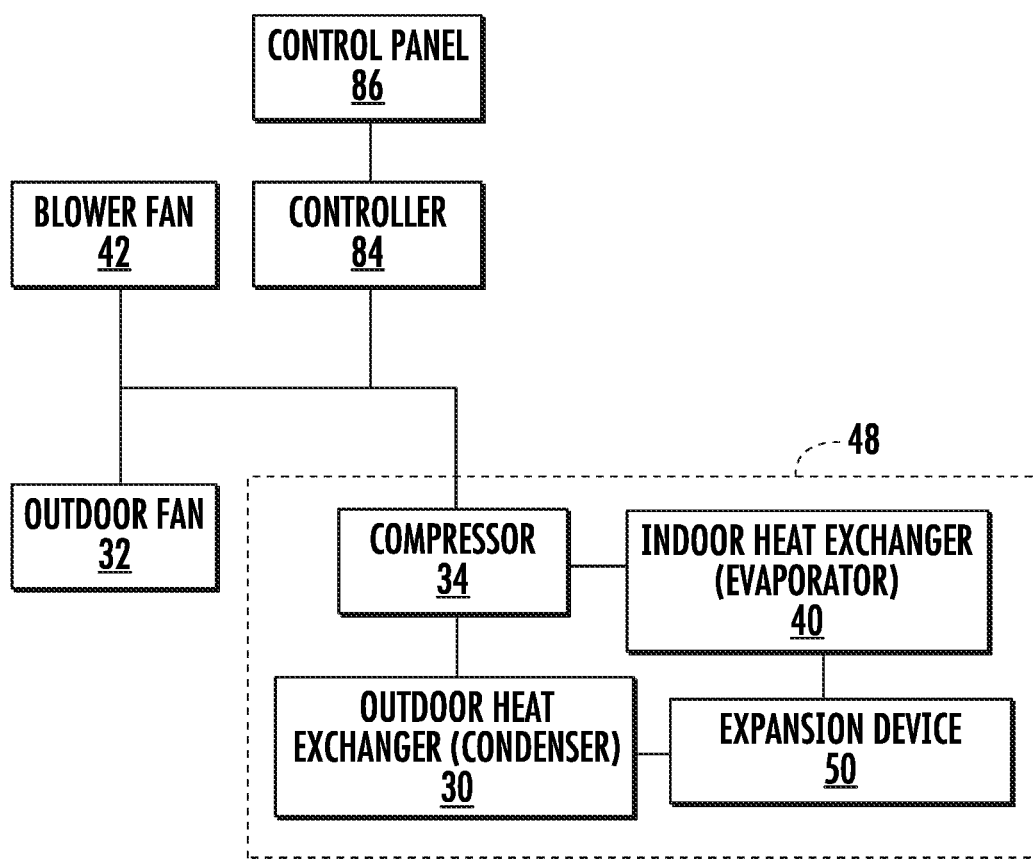
FIG. 3 is a schematic view of a refrigeration loop in accordance with one embodiment of the present disclosure.

Outdoor and indoor heat exchangers 30, 40 may be components of a sealed system or refrigeration loop 48, which is shown schematically in FIG. 3. Refrigeration loop 48 may, for example, further include compressor 34 and an expansion device 50. As illustrated, compressor 34 and expansion device 50 may be in fluid communication with outdoor heat exchanger 30 and indoor heat exchanger 40 to flow refrigerant therethrough as is generally understood. More particularly, refrigeration loop 48 may include various lines for flowing refrigerant between the various components of refrigeration loop 48, thus providing the fluid communication there between. Refrigerant may thus flow through such lines from indoor heat exchanger 40 to compressor 34, from compressor 34 to outdoor heat exchanger 30, from outdoor heat exchanger 30 to expansion device 50, and from expansion device 50 to indoor heat exchanger 40. The refrigerant may generally undergo phase changes associated with a refrigeration cycle as it flows to and through these various components, as is generally understood. Suitable refrigerants for use in refrigeration loop 48 may include pentafluoroethane, difluoromethane, or a mixture such as R410a, although it should be understood that the present disclosure is not limited to such examples and rather that any suitable refrigerant may be utilized.

As is understood in the art, refrigeration loop 48 may be alternately operated as a refrigeration assembly (and thus perform a refrigeration cycle) or a heat pump (and thus perform a heat pump cycle). As shown in FIG. 3, when refrigeration loop 48 is operating in a cooling mode and thus performing a refrigeration cycle, the indoor heat exchanger 40 acts as an evaporator and the outdoor heat exchanger 30 acts as a condenser. Alternatively, when the assembly is operating in a heating mode and thus performs a heat pump cycle, the indoor heat exchanger 40 acts as a condenser and the outdoor heat exchanger 30 acts as an evaporator. The outdoor and indoor heat exchangers 30, 40 may each include coils through which a refrigerant may flow for heat exchange purposes, as is generally understood.

According to an example embodiment, compressor 34 may be a variable speed compressor. In this regard, compressor 34 may be operated at various speeds depending on the current air conditioning needs of the room and the demand from refrigeration loop 48. For example, according to an exemplary embodiment, compressor 34 may be configured to operate at any speed between a minimum speed, e.g., 1500 revolutions per minute (RPM), to a maximum rated speed, e.g., 3500 RPM. According to still other embodiment, the maximum rated speed may be even higher, such as 7200 RPM. Notably, use of variable speed compressor 34 enables efficient operation of refrigeration loop 48 (and thus air conditioner unit 10), minimizes unnecessary noise when compressor 34 does not need to operate at full speed, and ensures a comfortable environment within the room.

Specifically, according to an exemplary embodiment, compressor 34 may be an inverter compressor. In this regard, compressor 34 may include a power inverter, power electronic devices, rectifiers, or other control electronics suitable for converting an alternating current (AC) power input into a direct current (DC) power supply for the compressor. The inverter electronics may regulate the DC power output to any suitable DC voltage that corresponds to a specific operating speed of compressor. In this manner compressor 34 may be regulated to any suitable operating speed, e.g., from 0% to 100% of the full rated power and/or speed of the compressor. This may facilitate precise compressor operation at the desired operating power and speed, thus meeting system needs while maximizing efficiency and minimizing unnecessary system cycling, energy usage, and noise.

In exemplary embodiments as illustrated, expansion device 50 may be disposed in the outdoor portion 14 between the indoor heat exchanger 40 and the outdoor heat exchanger 30. According to the exemplary embodiment, expansion device 50 may be an electronic expansion valve ("EEV") that enables controlled expansion of refrigerant, as is known in the art. More specifically, electronic expansion device 50 may be configured to precisely control the expansion of the refrigerant to maintain, for example, a desired temperature differential of the refrigerant across the indoor heat exchanger 40. In other words, electronic expansion device 50 throttles the flow of refrigerant based on the reaction of the temperature differential across indoor heat exchanger 40 or the amount of superheat temperature differential, thereby ensuring that the refrigerant is in the gaseous state entering compressor 34. According to alternative embodiments, expansion device 50 may be a capillary tube or another suitable expansion device configured for use in a thermodynamic cycle.

According to the illustrated exemplary embodiment, outdoor fan 32 is an axial fan and indoor fan 42 is a centrifugal fan. However, it should be appreciated that according to alternative embodiments, outdoor fan 32 and indoor fan 42 may be any suitable fan type. In addition, according to an exemplary embodiment, outdoor fan 32 and indoor fan 42 are variable speed fans, e.g., similar to variable speed compressor 34. For example, outdoor fan 32 and indoor fan 42 may rotate at different rotational speeds, thereby generating different air flow rates. It may be desirable to operate fans 32, 42 at less than their maximum rated speed to ensure safe and proper operation of refrigeration loop 48 at less than its maximum rated speed, e.g., to reduce noise when full speed operation is not needed. In addition, according to alternative embodiments, fans 32, 42 may be operated to urge make-up air into the room.

According to the illustrated embodiment, indoor fan 42 may operate as an evaporator fan in refrigeration loop 48 to encourage the flow of air through indoor heat exchanger 40. Accordingly, indoor fan 42 may be positioned downstream of indoor heat exchanger 40 along the flow direction of indoor air and downstream of heating unit 44. Alternatively, indoor fan 42 may be positioned upstream of indoor heat exchanger 40 along the flow direction of indoor air and may operate to push air through indoor heat exchanger 40.

Heating unit 44 in exemplary embodiments includes one or more heater banks 60. Each heater bank 60 may be operated as desired to produce heat. In some embodiments as shown, three heater banks 60 may be utilized. Alternatively, however, any suitable number of heater banks 60 may be utilized. Each heater bank 60 may further include at least one heater coil or coil pass 62, such as in exemplary embodiments two heater coils or coil passes 62. Alternatively, other suitable heating elements may be utilized.

The operation of air conditioner unit 10 including compressor 34 (and thus refrigeration loop 48 generally) indoor fan 42, outdoor fan 32, heating unit 44, expansion device 50, and other components of refrigeration loop 48 may be controlled by a processing device such as a controller 64. Controller 64 may be in communication (via for example a suitable wired or wireless connection) to such components of the air conditioner unit 10. Controller 64 may include a memory and one or more processing devices such as microprocessors, CPUs or the like, such as general or special purpose microprocessors operable to execute programming instructions or micro-control code associated with operation of unit 10. The memory may represent random access memory such as DRAM, or read only memory such as ROM or FLASH. In one embodiment, the processor executes programming instructions stored in memory. The memory may be a separate component from the processor or may be included onboard within the processor.

Unit 10 may additionally include a control panel 66 and one or more user inputs 68, which may be included in control panel 66. The user inputs 68 may be in communication with the controller 64. A user of the unit 10 may interact with the user inputs 68 to operate the unit 10, and user commands may be transmitted between the user inputs 68 and controller 64 to facilitate operation of the unit 10 based on such user commands. A display 70 may additionally be provided in the control panel 66 and may be in communication with the controller 64. Display 70 may, for example be a touchscreen or other text-readable display screen, or alternatively may simply be a light that can be activated and deactivated as required to provide an indication of, for example, an event or setting for the unit 10.

Figure 4:
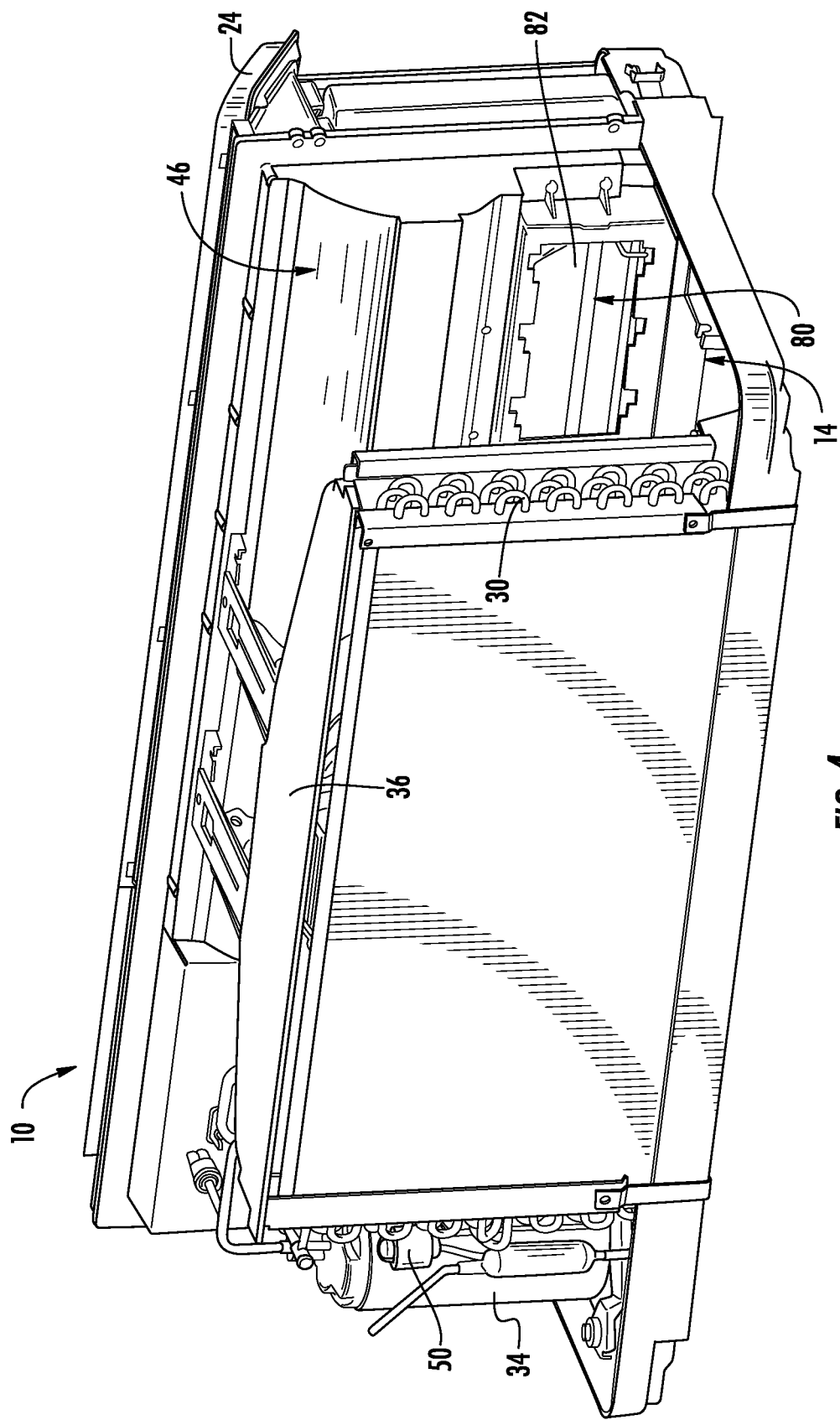
FIG. 4 is a rear perspective view of an outdoor portion of the exemplary air conditioner unit of FIG. 1, illustrating a vent aperture in a bulkhead in accordance with one embodiment of the present disclosure.

Referring briefly to FIG. 4, a vent aperture 80 may be defined in bulkhead 46 for providing fluid communication between indoor portion 12 and outdoor portion 14. Vent aperture 80 may be utilized in an installed air conditioner unit 10 to allow outdoor air to flow into the room through the indoor portion 12. In this regard, in some cases it may be desirable to allow outside air (i.e., "make-up air") to flow into the room in order, e.g., to meet government regulations, to compensate for negative pressure created within the room, etc. In this manner, according to an exemplary embodiment, make-up air may be provided into the room through vent aperture 80 when desired.

Figure 5:
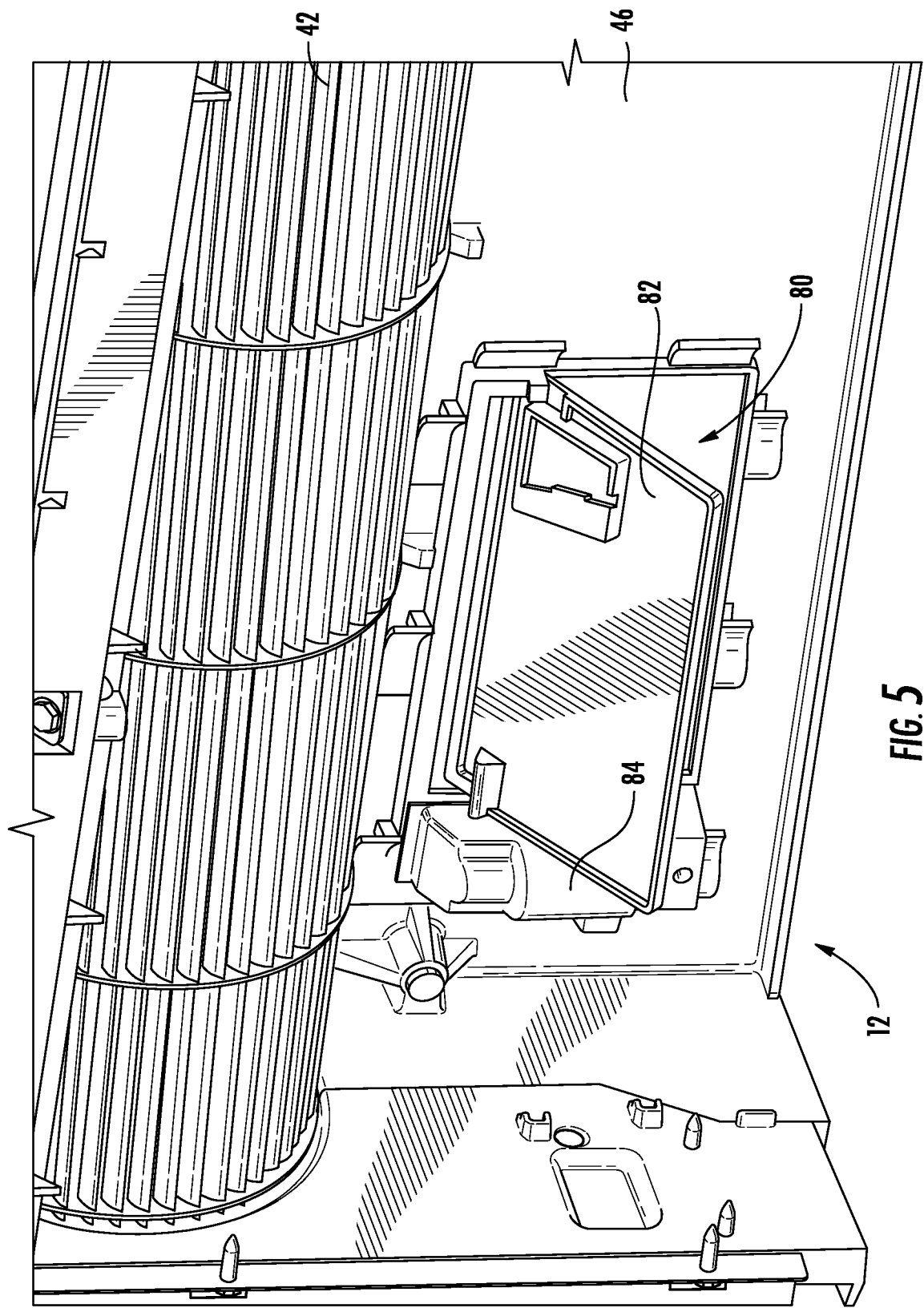
FIG. 5 is a front perspective view of the exemplary bulkhead of FIG. 4 with a vent door illustrated in the open position in accordance with one embodiment of the present disclosure.

As shown in FIG. 5, a vent door 82 may be pivotally mounted to the bulkhead 46 proximate to vent aperture 80 to open and close vent aperture 80. More specifically, as illustrated, vent door 82 is pivotally mounted to the indoor facing surface of indoor portion 12. Vent door 82 may be configured to pivot between a first, closed position where vent door 82 prevents air from flowing between outdoor portion 14 and indoor portion 12, and a second, open position where vent door 82 is in an open position (as shown in FIG. 5) and allows make-up air to flow into the room. According to the illustrated embodiment vent door 82 may be pivoted between the open and closed position by an electric motor 84 controlled by controller 64, or by any other suitable method.

In some cases, it may be desirable to treat or condition make-up air flowing through vent aperture 80 prior to blowing it into the room. For example, outdoor air which has a relatively high humidity level may require treating before passing into the room. In addition, if the outdoor air is cool, it may be desirable to heat the air before blowing it into the room. Therefore, according to an exemplary embodiment of the present subject matter, unit 10 may further include an auxiliary sealed system that is positioned over vent aperture 80 for conditioning make-up air. The auxiliary sealed system may be a miniature sealed system that acts similar to refrigeration loop 48, but conditions only the air flowing through vent aperture 80. According to alternative embodiments, such as that described herein, make-up air may be urged through vent aperture 80 without the assistance of an auxiliary sealed system. Instead, make-up air is urged through vent aperture 80 may be conditioned at least in part by refrigeration loop 48, e.g., by passing through indoor heat exchanger 40. Additionally, the make-up air may be conditioned immediately upon entrance through vent aperture 80 or sequentially after combining with the air stream induced through indoor heat exchanger 40.

Figure 6:
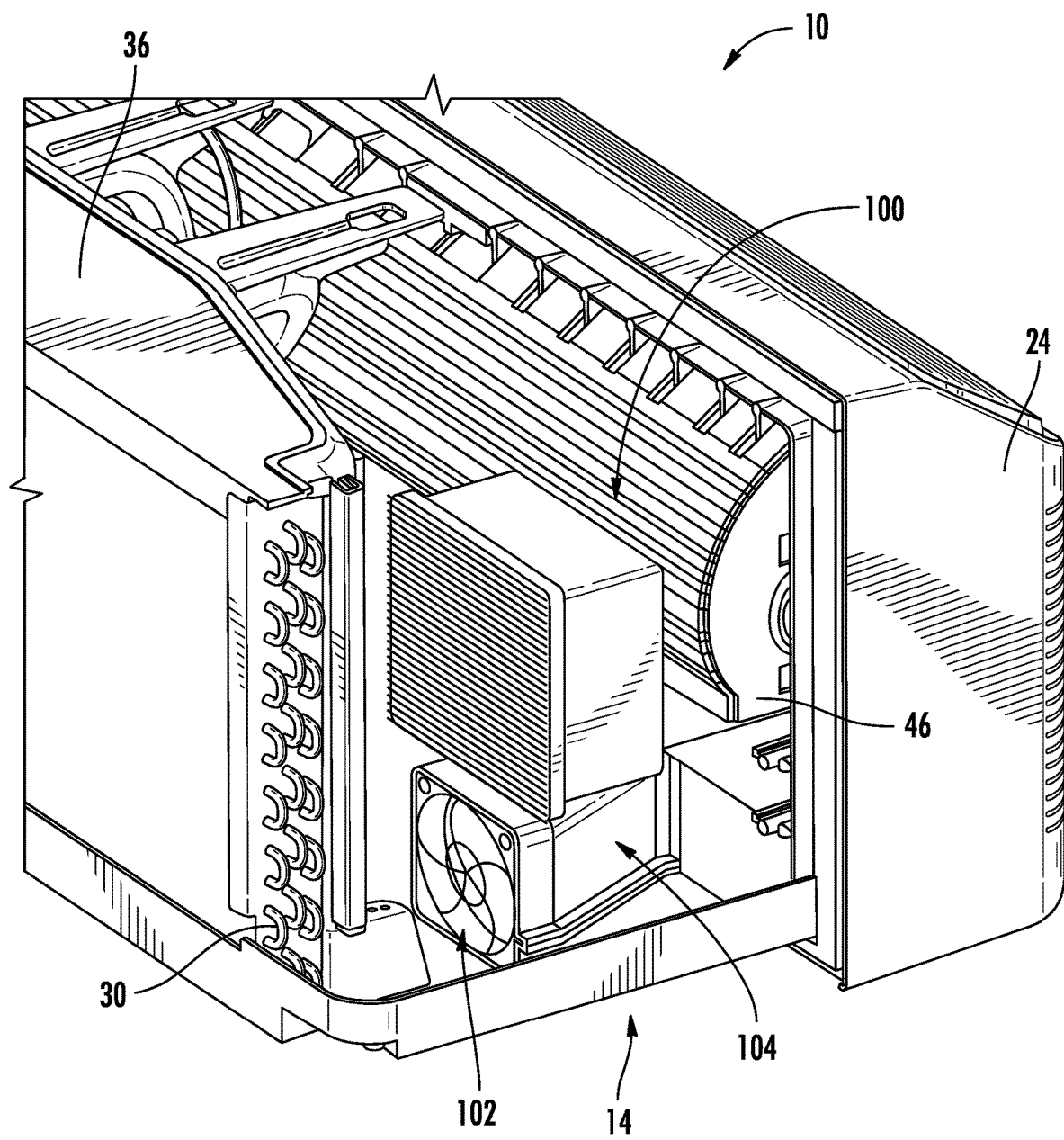
FIG. 6 is a rear perspective view of the exemplary air conditioner unit and bulkhead of FIG. 4 including a fan assembly for providing make-up air in accordance with one embodiment of the present disclosure.

Referring now to FIG. 6, a fan assembly 100 will be described according to an exemplary embodiment of the present subject matter. According to the illustrated embodiment, fan assembly 100 is generally configured for urging the flow of makeup air through vent aperture 80 and into a conditioned room without the assistance of an auxiliary sealed system. However, it should be appreciated that fan assembly 100 could be used in conjunction with a make-up air module including an auxiliary sealed system for conditioning the flow of make-up air. As illustrated, fan assembly 100 includes an auxiliary fan 102 for urging a flow of make-up air through a fan duct 104 and into indoor portion 12 through vent aperture 80.

According to the illustrated embodiment, auxiliary fan 102 is an axial fan positioned at an inlet of fan duct 104, e.g., upstream from vent aperture 80. However, it should be appreciated that any other suitable number, type, and configuration of fan or blower could be used to urge a flow of makeup air according to alternative embodiments. In addition, auxiliary fan 102 may be positioned in any other suitable location within air conditioner unit 10 and auxiliary fan 102 may be positioned at any other suitable location within or in fluid communication with fan duct 104. The embodiments described herein are only exemplary and are not intended to limit the scope present subject matter.

Figure 7:
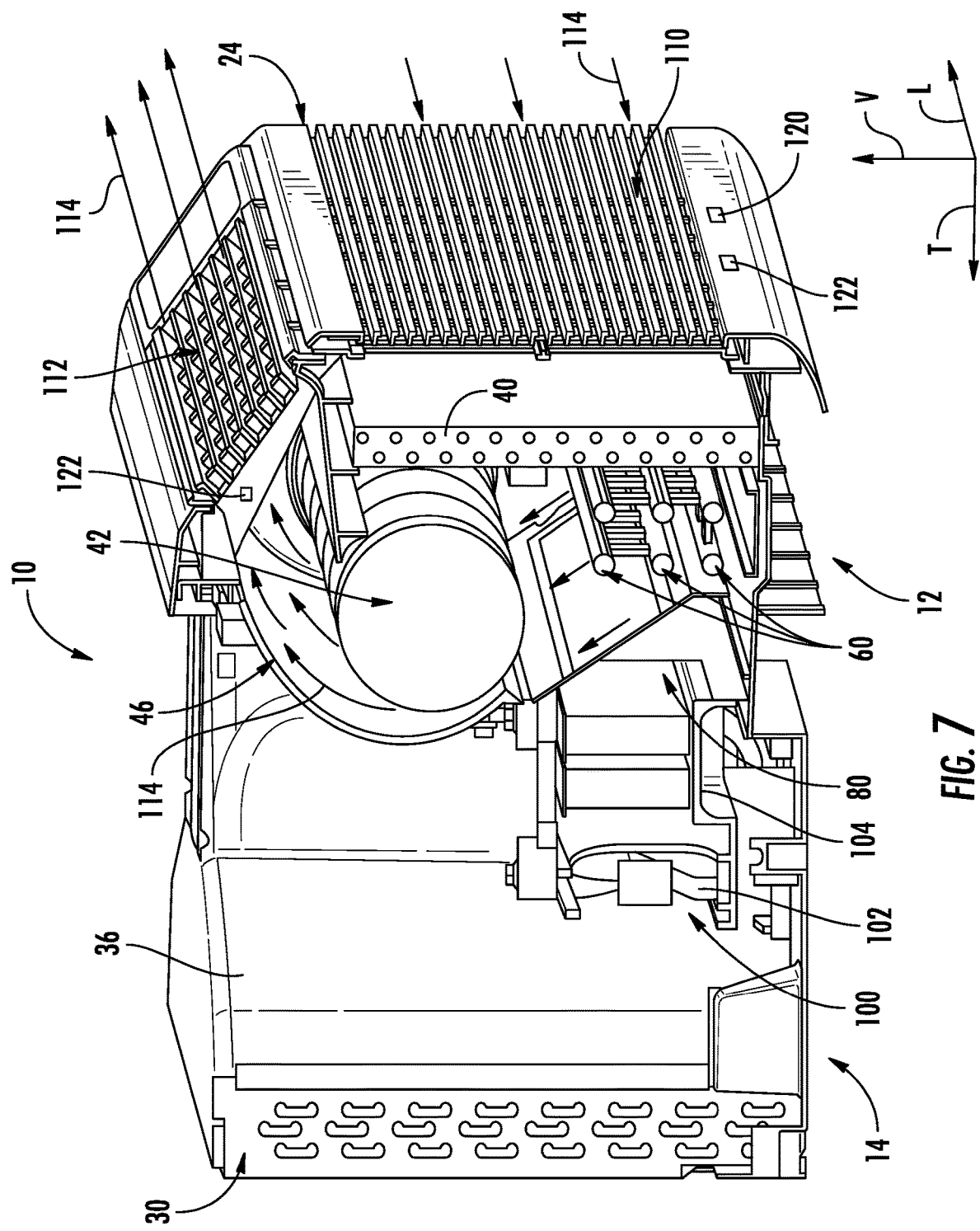
FIG. 7 is a side cross sectional view of the exemplary air conditioner unit of FIG. 1.

Referring now to FIG. 7, operation of unit 10 will be described according to an exemplary embodiment. More specifically, the operation of components within indoor portion 12 will be described during a cooling operation or cooling cycle of unit 10. To simplify discussion, the operation of auxiliary fan 102 for providing make-up air through vent aperture 80 will be omitted, e.g., as if vent door 82 were closed. Although a cooling cycle will be described, it should be further appreciated that indoor heat exchanger 40 and/or heating unit 44 be used to heat indoor air according to alternative embodiments. Moreover, although operation of unit 10 is described below for the exemplary packaged terminal air conditioner unit, it should be further appreciated that aspects the present subject matter may be used in any other suitable air conditioner unit, such as a heat pump or split unit system.

As illustrated, room front 24 of unit 10 generally defines an intake vent 110 and a discharge vent 112 for use in circulating a flow of air (indicated by arrows 114) throughout a room. In this regard, indoor fan 42 is generally configured for drawing in air 114 through intake vent 110 and urging the flow of air through indoor heat exchanger 40 before discharging the air 114 out of discharge vent 112. According to the illustrated embodiment, intake vent 110 is positioned proximate a bottom of unit 10 and discharge vent 112 is positioned proximate a top of unit 10. However, it should be appreciated that according to alternative embodiments, intake vent 110 and discharge vent 112 may have any other suitable size, shape, position, or configuration.

During a cooling cycle, refrigeration loop 48 is generally configured for urging cold refrigerant through indoor heat exchanger 40 in order to lower the temperature of the flow of air 114 before discharging it back into the room. Specifically, during a cooling operation, controller 64 may be provided with a target temperature, e.g., as set by a user for the desired room temperature. In general, components of refrigeration loop 48, outdoor fan 32, indoor fan 42, and other components of unit 10 operate to continuously cool the flow of air.

In order to facilitate operation of refrigeration loop 48 and other components of unit 10, unit 10 may include a variety of sensors for detecting conditions internal and external to the unit 10. These conditions can be fed to controller 64 which may make decisions regarding operation of unit 10 to rectify undesirable conditions or to otherwise condition the flow of air 114 into the room. For example, as best illustrated in FIG. 7, unit 10 may include an indoor temperature sensor 120 which is positioned and configured for measuring the indoor temperature within the room. In addition, unit 10 may include an indoor humidity sensor 122 which is positioned and configured for measuring the indoor humidity within the room. In this manner, unit 10 may be used to regulate the flow of air 114 into the room until the measured indoor temperature reaches the desired target temperature and/or humidity level.

As used herein, "temperature sensor" or the equivalent is intended to refer to any suitable type of temperature measuring system or device positioned at any suitable location for measuring the desired temperature. Thus, for example, temperature sensor 120 may each be any suitable type of temperature sensor, such as a thermistor, a thermocouple, a resistance temperature detector, a semiconductor-based integrated circuit temperature sensor, etc. In addition, temperature sensor 120 may be positioned at any suitable location and may output a signal, such as a voltage, to a controller that is proportional to and/or indicative of the temperature being measured. Although exemplary positioning of temperature sensors is described herein, it should be appreciated that unit 10 may include any other suitable number, type, and position of temperature, and/or other sensors according to alternative embodiments.

As used herein, the terms "humidity sensor" or the equivalent may be intended to refer to any suitable type of humidity measuring system or device positioned at any suitable location for measuring the desired humidity. Thus, for example, humidity sensor 122 may refer to any suitable type of humidity sensor, such as capacitive digital sensors, resistive sensors, and thermal conductivity humidity sensors. In addition, humidity sensor 122 may be positioned at any suitable location and may output a signal, such as a voltage, to a controller that is proportional to and/or indicative of the humidity being measured. Although exemplary positioning of humidity sensors is described herein, it should be appreciated that unit 10 may include any other suitable number, type, and position of humidity sensors according to alternative embodiments.

Now that the construction of air conditioner unit 10 and the configuration of controller 64 according to exemplary embodiments have been presented, an exemplary method 200 of operating a packaged terminal air conditioner unit will be described. Although the discussion below refers to the exemplary method 200 of operating air conditioner unit 10, one skilled in the art will appreciate that the exemplary method 200 is applicable to the operation of a variety of other air conditioning appliances. In exemplary embodiments, the various method steps as disclosed herein may be performed by controller 64 or a separate, dedicated controller.

Figure 8:
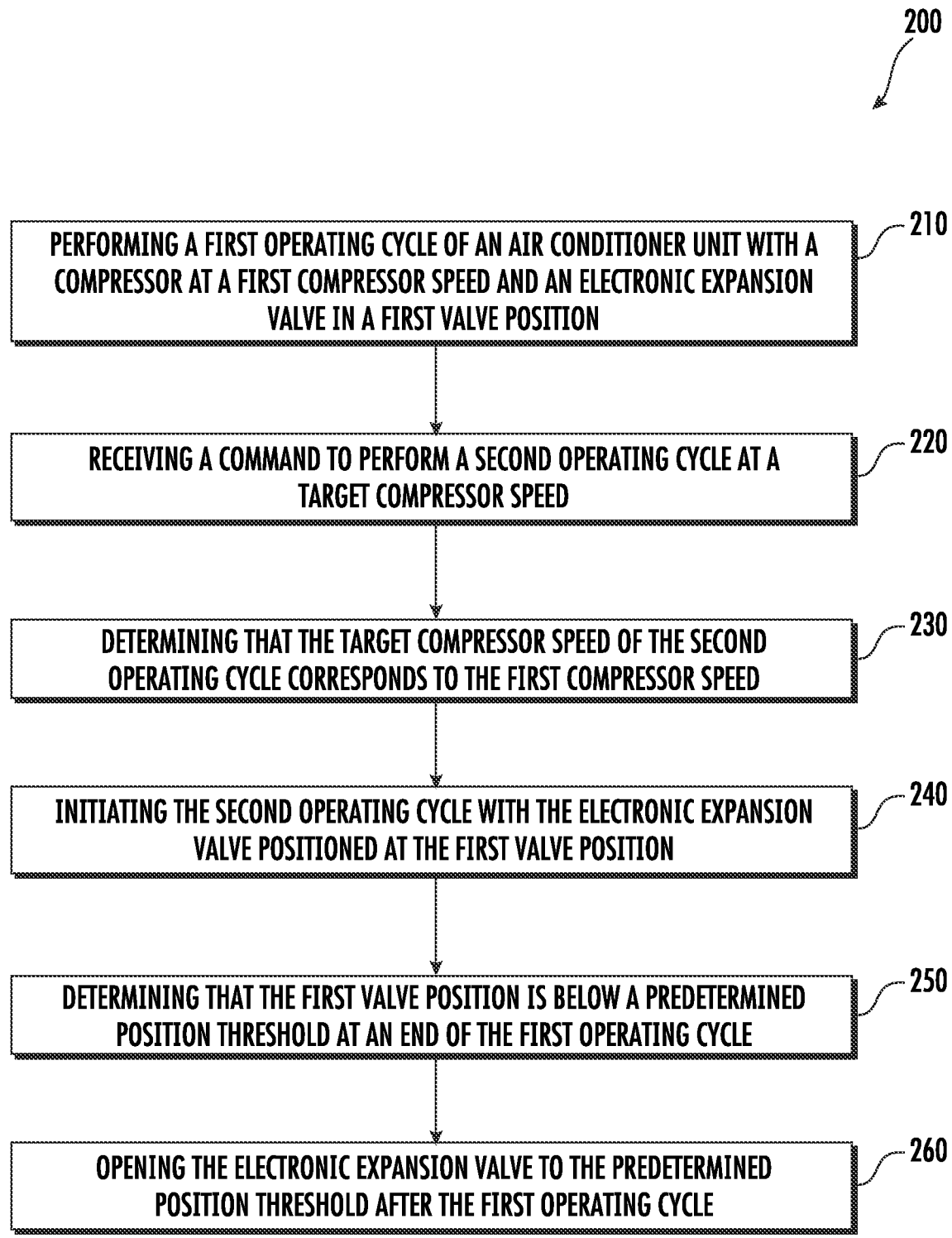
FIG. 8 illustrates a method for operating an air conditioner unit in accordance with one embodiment of the present disclosure.

Referring now to FIG. 8, method 200 includes, at step 210, performing a first operating cycle of an air conditioner unit. More specifically, according to exemplary embodiments, the first operating cycle may be performed with the compressor at a first compressor speed and the electronic expansion valve in a first valve position. In general, the first compressor speed may generally refer to the steady state compressor speed, e.g., determined by cycle type and sealed system demand. Similarly, the first valve position may generally refer to the steady state valve position, e.g., the valve position when the compressor is operating at the steady-state first compressor speed. Thus, the first compressor speed and the first valve position may be measured when the operation of the air conditioner unit has stabilized around the efficient operating point based on ambient conditions and the target room temperature.

For example, according to an exemplary embodiment, the first compressor speed and the first valve position may be determined at the end of the first operating cycle. Thus, according to an exemplary embodiment, the controller of air conditioner unit may be configured to stop the first operating cycle of the air conditioner unit (e.g., based on temperature feedback relative to the target room temperature) and record the first valve position of the electronic expansion valve at the end of the first operating cycle.

Step 220 may include receiving a command to perform a second operating cycle at a target compressor speed. In this regard, the second operating cycle may be a subsequent operating cycle to the first operating cycle. More specifically, the second operating cycle may be performed after the first operating cycle with no operating cycles in between. Similar to the first compressor speed, the target compressor speed may be determined by the controller based on ambient conditions, the target room temperature, etc.

As explained briefly above, if the electronic expansion valve is not set to an ideal position, the unit will run inefficiently or even potentially damage the compressor (e.g., by passing liquid refrigerant into the compressor). However, adjusting the EEV to stabilize at the ideal superheat value can take some time, resulting in cycle inefficiencies, particularly for short operating cycles where the controller may require most of the operating cycle to establish the target EEV position. Accordingly, at the commencement of the second operating cycle, the EEV may not be at the desired position, resulting in system inefficiencies or potentially harmful conditions. Accordingly, aspects of the present subject matter are directed to methods for avoiding these inefficiencies or conditions related to the EEV position.

In this regard, steps 230 and 240 are generally directed to comparing the operating parameters of the second operating cycle to the operating parameters of the previously performed first operating cycle to determine whether the two cycles are similar. If these two cycles are similar, method 200 may include utilizing the EEV position from the first operating cycle as an initialization point for the second operating cycle. In this manner, the second operating cycle may start at a known, efficient operating position of the EEV. Thus, the second operating cycle may be performed while avoiding dangerous or inefficient valve positions as the air conditioner unit transitions to steady state.

More specifically, step 230 may generally include determining that the target compressor speed of the second operating cycle corresponds to the first compressor speed of the first operating cycle. In general, the target compressor speed and the first compressor speed may "correspond" to each other if they are similar enough to justify the assumption that the EEV may be initialized in the first valve position for the second operating cycle. For example, the target compressor speed may correspond to the first compressor speed if it is equal to the first compressor speed or if it falls within a predetermined range surrounding the first compressor speed, e.g., such as plus or minus 1%, plus or minus 3%, plus or minus 5%, plus or minus 10%, plus or minus 15%, or plus or minus 25% of the first compressor speed.

According to still other embodiments, the controller of the air conditioner unit may be programmed with a plurality of compressor speed ranges of the compressor. For example, assuming the compressor has a minimum rated of speed of 1500 revolutions per minute and a maximum rated speed of 3500 revolutions per minute, this 2000 RPM operating range may be divided into a predetermined number of ranges. For example, the plurality of compressor speed ranges may include 10 speed ranges, each spanning 200 RPM, such that the 10 speed ranges collectively extend between 1500 and 3500 RPM. According to another exemplary embodiment, the compressor has a minimum rated of speed of 900 revolutions per minute and a maximum rated speed of 7200 revolutions per minute, and the corresponding 6300 RPM operating range may be divided into a predetermined number of ranges. For example, the plurality of compressor speed ranges may include 10 speed ranges, each spanning 630 RPM, such that the 10 speed ranges collectively extend between 900 and 7200 RPM. According to these exemplary embodiments, determining correspondence between the target compressor speed and the first compressor speed may include identifying the plurality of speed ranges and determining that the target compressor speed and the first compressor speed fall within a single range of the plurality of speed ranges. Although the correspondence of the first operating cycle and the second operating cycle is described herein as being based on the compressor speed, it should be appreciated that other operating parameters of the first and second operating cycles may be used to identify such correspondence or similarity between cycles.

After correspondence between the target compressor speed and the first compressor speed is determined, step 240 may include initiating the second operating cycle with the electronic expansion valve position that the first valve position. In this manner, knowledge regarding the efficient operating point of the EEV from a prior operating cycle may be used to improve the initialization and performance of a second, subsequent operating cycle. In this manner, overall system efficiency may be improved and dangerous operating conditions may be avoided.

As explained above, step 230 includes identifying a correspondence between the target compressor speed of a second operating cycle with the first compressor speed of the first operating cycle and step 240 includes initiating the second operating cycle with the electronic expansion valve at the first valve position from the first valve cycle. However, method 200 may further include determining that the target compressor speed of the second operating cycle does not correspond to the first compressor speed. In this regard, the ambient conditions and the target room temperature may result in a target compressor speed and operating cycle that is sufficiently different from the prior operating cycle. Under these conditions, method 200 may include initiating the second operating cycle with the electronic expansion valve at a predetermined default valve position (e.g., different than the first valve position). This predetermined default valve position may be determined based on the sealed system demand, ambient conditions, difference between the target temperature and the measured room temperature, cycle time, compressor speed, or any other suitable parameters. For example, the controller of air conditioner unit may include a lookup table with the predetermined default valve positions for various operating conditions.

Notably, if the EEV is in a restricted position at the end of a cooling cycle or heat pump cycle, the pressure within the refrigerant loop may not equalize before the system requests another cooling/heat pump cycle. This can cause the compressor to stall or lock up when starting, thereby creating noise, vibration, reduced compressor life, and poor system performance. Accordingly, aspects of the present subject matter are further directed to methods of ensuring that the refrigerant within refrigeration loop may balance or equalize in between operating cycles.

Accordingly, step 250 may include determining that the first valve position is below a predetermined position threshold at an end of the first operating cycle. Step 260 may include opening the electronic expansion valve to the predetermined position threshold after the first operating cycle. In this regard, the predetermined position threshold may be a valve positioned of the EEV that is suitable for permitting the balance of refrigerant within refrigeration loop. If the first valve position (e.g., determined at step 250) is below the predetermined position threshold, there is a possibility that the refrigerant may not normalize. Accordingly, step 260 may include opening the EEV to the predetermined position threshold to permit such equalization. By contrast, method 200 may further include determining a first valve position is greater than the predetermined position threshold and maintaining the electronic expansion valve in the first valve position after the first operating cycle.

FIG. 8 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using unit 10 as an example, it should be appreciated that this method may be applied to operate any suitable air conditioner unit.

As explained above, aspects of the present subject matter are generally directed to systems and methods to improve performance of an air conditioner by preparing an electronic expansion valve (EEV) at the end of a last cycle for the start of a next cycle by evaluating proximity to valve position extremes. For example, if the cooling or heat pump cycle ends and the EEV closed below a specified threshold value, the EEV may be opened to threshold value. By contrast, if the EEV is closed above or more than a specified threshold value, the EEV may remain in its current position. This can improve system reliability and customer satisfaction, e.g., because if the EEV is at a restricted position at the end of a cooling or heat pump cycle, the pressure might not equalize before the system requests another cooling or heat pump cycle. This unequal pressure may cause the compressor to stall or lock up when starting, thereby harming system performance and reducing compressor life. In addition, the air conditioner may initialize the EEV position at the same position as the end of the previous cycle when the new cycle type is the same as the previous cycle type. Otherwise, the EEV may be initialized to the default position for a cycle/compressor speed when the new cycle type is different from the previous cycle type. In this manner, the air conditioner may run more efficiently and potential damage to the compressor may be avoided.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An air conditioner unit comprising:
    a refrigeration loop comprising an outdoor heat exchanger and an indoor heat exchanger;
    a compressor operably coupled to the refrigeration loop and being configured to urge a flow of refrigerant through the refrigeration loop;
    an electronic expansion valve fluidly coupled to the refrigeration loop; and
    a controller operably coupled to the compressor and the electronic expansion valve, the controller being configured to:
        perform a first operating cycle of the air conditioner unit with the compressor at a first compressor speed and the electronic expansion valve in a first valve position, wherein the first compressor speed and the first valve position are determined at an end of the first operating cycle;
        receive a command to perform a second operating cycle at a target compressor speed;
        determine that the target compressor speed of the second operating cycle corresponds to the first compressor speed; and
        initiate the second operating cycle with the electronic expansion valve positioned at the first valve position.

2. The air conditioner unit of claim 1, wherein determining that the target compressor speed of the second operating cycle corresponds to the first compressor speed of the first operating cycle comprises:
    identifying a plurality of compressor speed ranges of the compressor; and
    determining that the target compressor speed and the first compressor speed fall within one range of the plurality of compressor speed ranges.

3. The air conditioner unit of claim 2, wherein the plurality of compressor speed ranges comprises ten speed ranges collectively extending from a minimum rated speed of 1500 revolutions per minute to a maximum rated speed of 3500 revolutions per minute.

4. The air conditioner unit of claim 1, wherein the controller is further configured to:
    stop the first operating cycle of the air conditioner unit; and
    record the first valve position of the electronic expansion valve at an end of the first operating cycle.

5. The air conditioner unit of claim 1, wherein the controller is further configured to:
    determine that the target compressor speed of the second operating cycle does not correspond to the first compressor speed; and
    initiate the second operating cycle with the electronic expansion valve at a predetermined default valve position.

6. The air conditioner unit of claim 5, wherein the predetermined default valve position is based on at least one of a cycle type or a compressor speed.

7. The air conditioner unit of claim 1, wherein the controller is further configured to:

determine that the first valve position is below a predetermined position threshold at an end of the first operating cycle; and open the electronic expansion valve to the predetermined position threshold after the first operating cycle.

8. The air conditioner unit of claim 1, wherein the controller is further configured to:

determine that the first valve position is greater than or equal to a predetermined position threshold at an end of the first operating cycle; and maintain the electronic expansion valve in the first valve position after the first operating cycle.

9. The air conditioner unit of claim 1, wherein the air conditioner unit is a single-package vertical unit (SPVU) or a package terminal air conditioner (PTAC).

10. A method of operating an air conditioner unit, the air conditioning unit comprising a refrigeration loop, a compressor, and an electronic expansion valve, the method comprising:

performing a first operating cycle of the air conditioner unit with the compressor at a first compressor speed and the electronic expansion valve in a first valve position;

receiving a command to perform a second operating cycle at a target compressor speed;

determining that the target compressor speed of the second operating cycle corresponds to the first compressor speed;

initiating the second operating cycle with the electronic expansion valve positioned at the first valve position;

determining that the first valve position is greater than or equal to a predetermined position threshold at an end of the first operating cycle; and maintaining the electronic expansion valve in the first valve position after the first operating cycle.

11. The method of claim 10, wherein the first compressor speed and the first valve position are determined at an end of the first operating cycle.

12. The method of claim 10, wherein determining that the target compressor speed of the second operating cycle corresponds to the first compressor speed of the first operating cycle comprises:

identifying a plurality of compressor speed ranges of the compressor; and determining that the target compressor speed and the first compressor speed fall within one range of the plurality of compressor speed ranges.

13. The method of claim 12, wherein the plurality of compressor speed ranges comprises ten speed ranges collectively extending from a minimum rated speed of 1500 revolutions per minute to a maximum rated speed of 3500 revolutions per minute.

14. The method of claim 10, further comprising:

stopping the first operating cycle of the air conditioner unit; and recording the first valve position of the electronic expansion valve at an end of the first operating cycle.

15. The method of claim 10, further comprising:

determining that the target compressor speed of the second operating cycle does not correspond to the first compressor speed; and initiating the second operating cycle with the electronic expansion valve at a predetermined default valve position.

16. The method of claim 15, wherein the predetermined default valve position is based on at least one of a cycle type or a compressor speed.

17. The method of claim 10, further comprising:

determining that the first valve position is below a predetermined position threshold at an end of the first operating cycle; and opening the electronic expansion valve to the predetermined position threshold after the first operating cycle.

18. The method of claim 10, wherein the air conditioner unit is a single-package vertical unit (SPVU) or a package terminal air conditioner (PTAC).

19. An air conditioner unit comprising:

a refrigeration loop comprising an outdoor heat exchanger and an indoor heat exchanger;

a compressor operably coupled to the refrigeration loop and being configured to urge a flow of refrigerant through the refrigeration loop;

an electronic expansion valve fluidly coupled to the refrigeration loop; and a controller operably coupled to the compressor and the electronic expansion valve, the controller being configured to:

perform a first operating cycle of the air conditioner unit with the compressor at a first compressor speed and the electronic expansion valve in a first valve position;

receive a command to perform a second operating cycle at a target compressor speed;

determine that the target compressor speed of the second operating cycle corresponds to the first compressor speed;

initiate the second operating cycle with the electronic expansion valve positioned at the first valve position; and determine that the first valve position is below a predetermined position threshold at an end of the first operating cycle; and open the electronic expansion valve to the predetermined position threshold after the first operating cycle.

20. The air conditioner unit of claim 19, wherein the controller is further configured to:

stop the first operating cycle of the air conditioner unit; and record the first valve position of the electronic expansion valve at an end of the first operating cycle.

* * * * *